(12) United States Patent
Steenhoek et al.

(10) Patent No.: US 10,739,259 B2
(45) Date of Patent: Aug. 11, 2020

(54) SYSTEMS AND METHODS FOR MEASURING REFLECTIVITY OF A PAINTED OBJECT

(71) Applicant: AXALTA COATING SYSTEMS IP CO., LLC, Wilmington, DE (US)

(72) Inventors: Larry E. Steenhoek, Wilmington, DE (US); Robert V. Canning, Bear, DE (US)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 26 days.

(21) Appl. No.: 16/233,338

(22) Filed: Dec. 27, 2018

(65) Prior Publication Data

US 2020/0209156 A1    Jul. 2, 2020

(51) Int. Cl.
*G01N 21/00* (2006.01)
*G01N 21/55* (2014.01)
*G01N 21/84* (2006.01)

(52) U.S. Cl.
CPC ......... *G01N 21/55* (2013.01); *G01N 21/8422* (2013.01); *G01N 2021/8427* (2013.01); *G01N 2201/061* (2013.01); *G01N 2201/062* (2013.01)

(58) Field of Classification Search
CPC .......... G01N 1/00; G01N 1/28; G01N 1/2813; G01N 13/00; G01N 15/00; G01N 21/41; G01N 21/55; G01N 2021/557; G01N 21/8422; G01N 21/86
See application file for complete search history.

(56) References Cited

U.S. PATENT DOCUMENTS

| | | | | |
|---|---|---|---|---|
| 4,715,709 A | * | 12/1987 | Sekine | ............... G01N 21/9515 250/559.48 |
| 2013/0057678 A1 | * | 3/2013 | Prior Carrillo | .... G01N 21/8806 348/125 |
| 2016/0178528 A1 | | 6/2016 | Weimer et al. | |

FOREIGN PATENT DOCUMENTS

WO    2017201334 A1    11/2017

* cited by examiner

*Primary Examiner* — Don K Wong
(74) *Attorney, Agent, or Firm* — Lorenz & Kopf, LLP

(57) ABSTRACT

A system for measuring the reflectivity of a painted object includes an electromagnetic wave source that emits an electromagnetic wave, a panel that holds the painted object, with the panel being movable to adjust an incident angle of the electromagnetic wave onto the panel, a reflector to receive and direct electromagnetic waves that are reflected by the painted object towards the reflector, a detector to detect an intensity of electromagnetic waves, and a control unit. The control unit is communicatively connected to the panel and to the detector. The control unit determines the incident angle of the electromagnetic wave, receives the intensity of the electromagnetic wave detected by the detector, and determines the reflectivity of the painted object as a function of the intensity of the electromagnetic wave detected by the detector over a predetermined range of incident angle values.

20 Claims, 8 Drawing Sheets

SYSTEMS AND METHODS FOR MEASURING REFLECTIVITY OF A PAINTED OBJECT

TECHNICAL FIELD

The description is directed to systems and methods for measuring reflectivity of a painted object. The description is particularly directed to systems and methods for measuring lidar-reflectivity of a painted object.

BACKGROUND

Surface coatings such as monocoat, clearcoat/colorcoat, and tricoat are favored for the protection and decoration of substrates such as vehicle bodies. The surface coatings can utilize one or more pigments or effect pigments to impart the desired color or appearance, such as solid, metallic, pearlescent effect, gloss, or distinctness of image, to the vehicle bodies. Metallic flakes, such as aluminum flakes and pearlescent flakes are commonly used to produce coatings having flake appearances such as texture, sparkle, glint and glitter as well as the enhancement of depth perception in the coatings imparted by the flakes.

Lidar is a technology that measures distance to a target by illuminating the target with pulsed laser light and measuring the reflected pulses with a sensor. Lidar is one of the key enabling sensing technologies utilized in the development of autonomous vehicles. Lidar systems used for autonomous vehicle applications usually use lasers in the near-IR region of the electromagnetic spectrum. Typically, pulses of light are sent from the lidar unit, and the time delay measured for the reflected pulse to be sensed by the lidar unit is used to calculate the distance between the reflecting object and the lidar unit.

Thus, a need exists to determine the lidar-reflectivity of an object painted with a given paint or coating.

BRIEF SUMMARY

An aspect is directed to a system for measuring the reflectivity of a painted object, the system comprising an electromagnetic wave source that is configured to emit an electromagnetic wave, a panel that is configured to hold the painted object, wherein the panel is movable to adjust an incident angle of the electromagnetic wave onto the panel, a reflector that is arranged to receive and direct electromagnetic waves that are reflected by the painted object towards the reflector, a detector that is configured to detect an intensity of electromagnetic waves, and a control unit. The control unit is communicatively connected to the panel and to the detector. The control unit is configured to determine the incident angle of the electromagnetic wave, to receive the intensity of the electromagnetic wave detected by the detector, and to determine the reflectivity of the painted object as a function of the intensity of the electromagnetic wave detected by the detector over a predetermined range of incident angle values.

Another aspect is directed to a system for measuring the reflectivity of a painted object, the system comprising a panel that is configured to hold the painted object, an electromagnetic wave source that is configured to emit an electromagnetic wave so that the electromagnetic wave impinges the panel at a predetermined incident angle with respect to the panel, a detector that is configured to detect an intensity of electromagnetic waves reflected by the painted object at a predetermined reflection angle with respect to a surface of the panel, and a control unit. The control unit is communicatively connected to the electromagnetic wave source and to the detector. The control unit is configured to determine an intensity of the electromagnetic wave emitted towards the panel. The control unit is further configured to receive the intensity of the electromagnetic wave detected by the detector. The control unit is further configured to determine the reflectivity of the painted object as a function of the intensity of the electromagnetic waves detected by the detector and the intensity detected by the detector.

Another aspect is directed to a method for measuring the reflectivity of a painted object, the method comprising the following steps: emitting, by an electromagnetic wave source, an electromagnetic wave towards the painted object; rotating, by a movable panel, the painted object to adjust an incident angle of the electromagnetic wave onto the painted object; determining, by a detector, an intensity of an electromagnetic wave that is reflected by the painted object; determine, by a control unit, the incident angle of the electromagnetic wave; receiving, by the control unit, the intensity of the electromagnetic waves from the detector; determine, by the control unit, the reflectivity of the painted object as a function of the intensity of the electromagnetic wave determined by the detector over a predetermined range of incident angle values.

DETAILED DESCRIPTION

Figure 1:
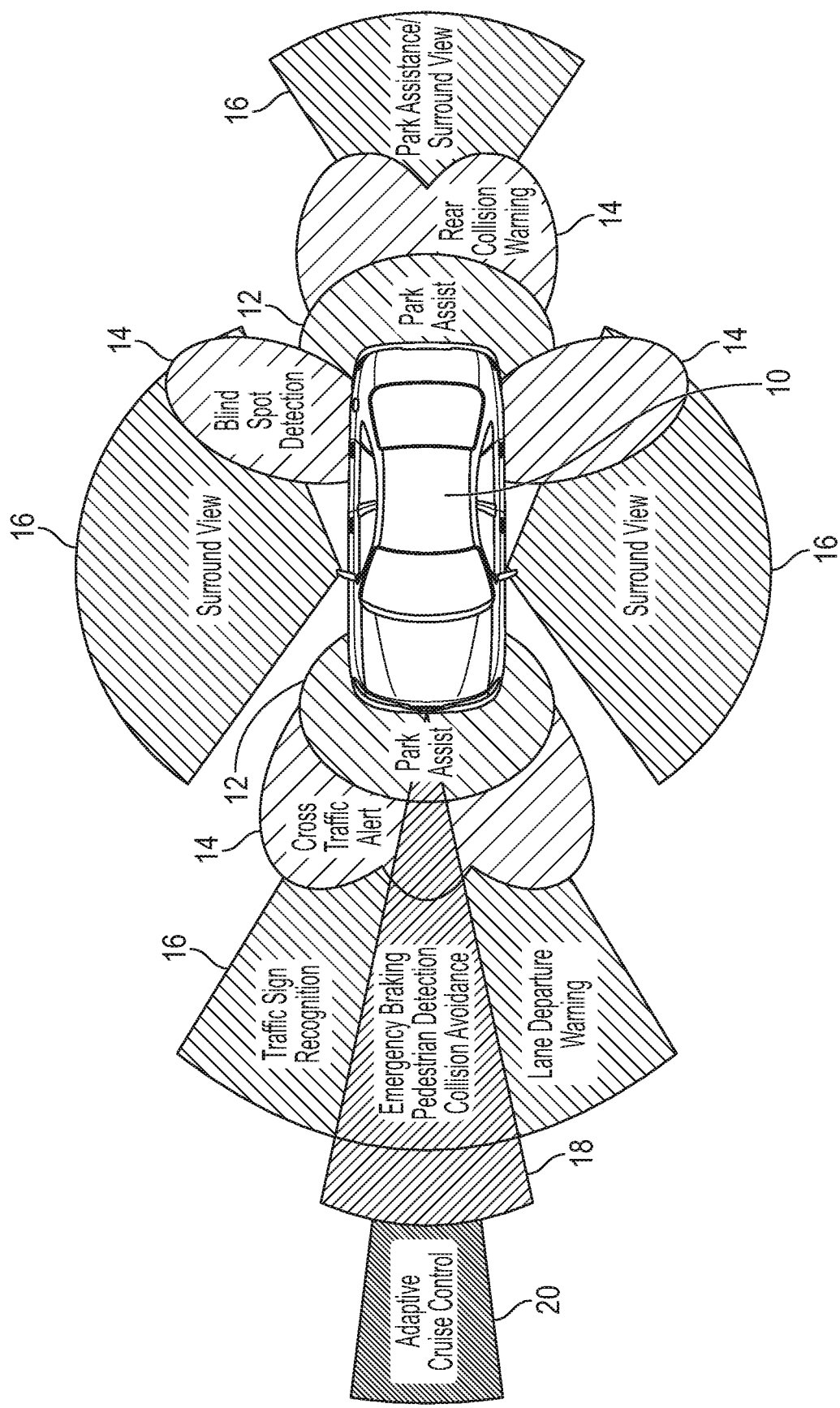
FIG. 1 shows a representative configuration of sensor technologies and their application in a vehicle.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment also includes metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments.

Gonioapparent flakes refer to flakes which change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, or other visual effects of a coating, especially when viewed from varying viewing angles and/or with varying illumination angles.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

Each of the terms "vehicle", "automotive", "automobile", "automotive vehicle", and "automobile vehicle" refer to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, an iPod, an iPod/MP Player, a tablet computer, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a subunit of another device. Examples of such a subunit can be a processing chip in an imaging device, a spectrophotometer, or a goniospectrophotometer. A computing device may be connected to a display device, such as a monitor screen.

The control unit as referred to herein may be a computing device. The control unit at least contains a processor, a microcontroller, or a programmable logic, or a combination thereof, that executes instructions to carry out the functions described herein.

A "portable computing device" includes a laptop computer, a pocket PC, a personal digital assistant (PDA), a handheld electronic processing device, a mobile phone, a smart phone that combines the functionality of a PDA and a mobile phone, a tablet computer, an iPod, an iPod/MP Player, or any other stand alone or subunit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, Wi-Max device, local area network (LAN) device, 3G/4G/5G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

The term "memory" relates to a computer readable storage device or media and may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor in executing the steps described herein.

This disclosure is directed to systems and method for measuring the reflectivity of a painted object. The reflectivity is particularly measured by using a laser diode.

Lidar is a technology that measures distance to a target by illuminating the target with pulsed laser light and measuring the reflected pulses with a sensor. Lidar is one of the key enabling sensing technologies utilized in the development of autonomous vehicles. It is important that lidar systems be able to detect all vehicles regardless of the color or type or color of the paint used on the vehicle. Lidar systems used for autonomous vehicle applications usually use lasers in the near-IR region of the electromagnetic spectrum. Pulses of light are sent from the lidar unit, and the time delay measured for the reflected pulse to be sensed by the lidar unit is used to calculate the distance between the reflecting object and the lidar unit. A number of factors affect the intensity of the reflected light, these include range, incident angle, and surface composition. When a pulse of light from the lidar unit strikes a (painted) surface it is either absorbed or scattered/reflected from the surface. The percentage of the light which is retroreflected back to the lidar unit is a function of the paint pigmentation, paint system structure (solid colors vs. effect colors), and incident angle of the light pulse to the surface normal of the sample.

Lidar systems are usually configured to scan an area at a medium to large distance, and at these distances usually are sampling a sizable area at any moment. As a result of the long sensing distance and large viewing, these lidar systems are not well suited for the measurement of small samples typically used in a paint laboratory. Additionally, these lidar systems are not equipped with the ability to adjust the angle of incidence of the lidar beam to the test panel in a convenient fashion. What is needed to characterize the lidar sensitivity of various laboratory scale painted samples is a device that measures the retroreflectivity of such painted samples at lidar wavelengths as a function of incident angle.

This need is met by the systems and method of the present disclosure. Particularly, the systems of the present disclosure comprise a reflectometer like a laser gonio-reflectometer or retro-reflectometer to measure the reflectance of painted panels at lidar wavelengths as a function of incident angle. The systems are capable of making these measurements with high angular resolution, and high signal dynamic range on small laboratory painted panels (having a size of 4"×6", for example).

FIG. 1 exemplarily shows a vehicle 10 with several sensor technologies and their application. The vehicle 10 comprises an ultrasound system 12 that is typically used for park assistance having a short range. Short and medium range radar system 14 are used for cross traffic alert, blind spot detection, and rear collision warning. Optical sensors 16, like a camera, with a range that is larger than the range of the short and medium range radar system 14 may be used for traffic sign recognition, lane departure warning, surround view, and park assistance. For even larger ranges, a lidar system 18 may be used for collision avoidance, pedestrian detection, or emergency braking. Long-range radar system 20 may be used for adaptive cruise control. The systems and method described herein may be used in any systems that use lidar. Particularly, the systems and method described herein may be part of the lidar system 18. However, it is also possible to use the principles of the systems and method described herein in the long-range radar to determine the effect of the reflectivity of the coating on the long-range radar distance measurement.

Figure 2:
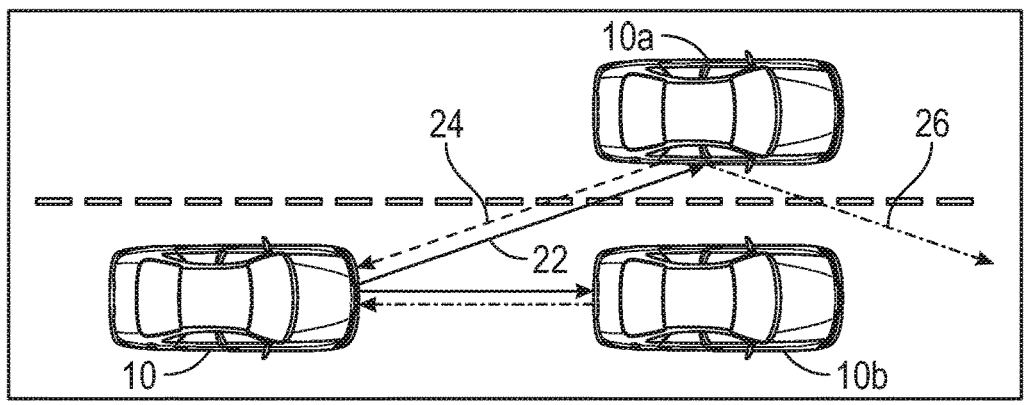
FIG. 2 shows a schematic use case of lidar sensing technology.

FIG. 2 exemplarily shows the working principle of lidar scanners. Lidar scanners need to be able to detect objects over a wide range of angles depending on the position of the objects 10a, 10b relative to the sensor containing vehicle 10. In FIG. 2, reference numeral 10 generally identifies the vehicle with the distance sensor, and reference numerals 10a and 10b identify vehicles within the detection range of the distance sensor of vehicle 10. Vehicle 10b is directly in front of the vehicle 10 in nearly retroreflector position. Vehicle 10a is ahead in adjacent lanes in grazing angle position relative to vehicle 10. Vehicle 10 emits at least one primary beam 22 that is reflected by at least one of the objects 10a, 10b in front of the vehicle 10. Vehicles 10a, 10b send back a reflected beam 24. The object 10a may also reflect a dispersed beam 22. Thus, the intensity of the reflected beam 24 may be lower than the intensity of the primary beam 22. In case of retro-reflectance (vehicle 10b), the intensity of the reflected beam may be nearly the intensity of the primary beam. This, however, depends on the characteristics of the paint coating.

In order to assess the ability of a paint film to reflect lidar wavelengths, it is required to determine the sample reflectance at lidar wavelengths as a function of incident angle of a primary beam 22 onto the surface of the detected object. Solid colors typically act as "Lambertian" scatterers. Their reflectance is largely independent of the incident angle of the primary beam. Effect colors may be highly directional, and their reflectance will vary widely over the required range of angles. This is similar to the lightness flop of effect colors when observed in the visible wavelength range. Reflectance measurement made on instruments used to measure Total Solar Reflectance (TSR) are not useful here. While they include the proper wavelength range, they also utilize sphere geometries that average out any angular behavior. Thus, the systems and methods described herein utilize a lidar wavelength gonio-reflectometer.

Figure 3:
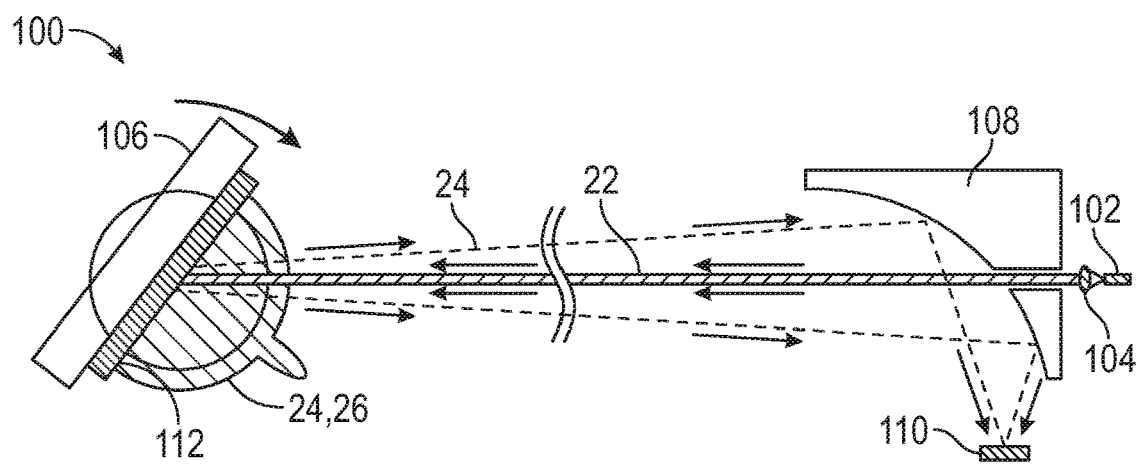
FIG. 3 shows an exemplary embodiment of a system for measuring the reflectivity of a painted object.

FIG. 3 shows a system 100 for measuring the reflectivity of a painted object 112. The system 100 comprises an electromagnetic wave source 102 that is configured to emit an electromagnetic wave. The light source may be a light emitter, particularly a laser diode, and emits the primary beam 22. The system 100 further comprises a panel 106 that is configured to hold the painted object 112, wherein the panel is movable to adjust an incident angle of the electromagnetic wave 22 onto the panel. The system 100 further comprises a reflector 108 that is arranged to receive and direct electromagnetic waves 24 that are reflected (i.e., the reflected beam or beams) by the painted object 112 towards the reflector 108. The system 100 further comprises a detector 110 that is configured to detect an intensity of electromagnetic waves of the reflected beam 24. The system 100 further comprises a control unit 114 (see FIG. 5). The control unit 114 is communicatively connected to the panel and to the detector. The control unit is configured to determine the incident angle of the electromagnetic wave 22 onto the panel or painted object, to receive the intensity of the electromagnetic wave 24 detected by the detector, and to determine the reflectivity of the painted object as a function of the intensity of the electromagnetic wave 24 detected by the detector 110 over a predetermined range of incident angle values.

The detector 110 may determine the intensity of the electromagnetic wave 24 standardized to the intensity of beam 24.

The painted object 112 may be painted flat sample. The normal of the painted object 112 and the normal to the panel surface where the painted object is affixed may be parallel.

The panel 106 is designed such that the painted object or painted sample is fastened or mounted to a surface of the panel. When moving or rotating the panel 106, the painted object is moved or rotated as well, so that the incident angle of the electromagnetic wave with respect to the painted object is adjusted.

The incident angle may be measured with reference to the surface of the panel or the surface of the painted object. Thus, the incident angle is the angle between a surface of the panel and an incident direction of the electromagnetic wave 22. In this case and when using a flat panel, the incident angle may be between 0 degree and 180 degrees. However, it is also possible to measure the incident angle with respect to a surface normal which is defined as 0 degree. In that case, the incident angle may adopt values between −90 degrees and +90 degrees.

The control unit may be a computer that is configured to execute functions and to control the components of the system 100 in accordance to the functions described above and below. The computer may be configured to bidirectionally communicate at least with the detector (to receive the intensity of reflected beam 24) and the panel (to send commands for rotating the panel).

The reflectivity may particularly be a grade of reflectivity which indicates the ratio of the intensity of the reflected or detected electromagnetic waves 24 with respect to the intensity of the emitted electromagnetic wave 22.

The system 100 may comprise a lens 104 that is arranged so that the primary beam 22 passes the lens.

In one embodiment, the electromagnetic wave source 102 is a laser that is configured to emit electromagnetic waves in the range between 10 μm and 250 nm.

The wavelengths of the laser may vary depending on the specific use case, detection range, size of the objects to be detected, etc. The laser may be an illumination unit 101 (see FIG. 11) and comprises a laser diode 102 and a lens 104. Any known laser that is suitable for the purpose of distance detection can be used.

The laser light 22 is emitted either in a pulsed manner or continuously towards the painted object 112.

In one embodiment, the electromagnetic wave source 102 is a light emitting diode or an incandescent light source.

In this embodiment, the system may further comprise a filter (not shown) that is arranged such that it limits the bandwidth of the electromagnetic wave source to a desired wave length range. Preferably, the filter is arranged between the electromagnetic wave source 102 and the painted object 112. Thus, the bandwidth of the electromagnetic waves directed towards the panel are limited to the predetermined wavelength range.

In one embodiment, the panel 106 is rotatable about an axis of rotation to change the incident angle of the primary beam 22 onto the surface of the painted object. In FIG. 3, changing the incident angle is indicated by the circular arrow on top of the panel 106. In this embodiment, the panel 106 rotates in the clockwise direction.

As can be seen in FIG. 3, the painted object 112 is affixed to a surface of the panel 106. The primary beam 22 is reflected in multiple directions. There is not only one secondary beam 24, but the primary beam 22 is typically scattered. The intensity of the scattered light differs depending on the incident angle of the primary beam 22 and the position of measuring the reflected beam(s) 24.

The panel 106 is arranged opposite to the electromagnetic wave source 102 so that the electromagnetic wave 22 is emitted by the electromagnetic wave source towards the panel. In particular, the primary beam 22 is emitted directly towards the panel, i.e., towards the sample object. Alternatively, the panel and the laser might be arranged such that the emitted electromagnetic wave is redirected on its way from the laser to the panel, for example by one or multiple reflective surfaces. However, the incident angle is measured between the orientation of the panel or painted object and the direction of the electromagnetic wave 22 as it hits the surface of the painted object or panel.

In one embodiment, the reflector 108 comprises a reflective surface, wherein the reflective surface is curved such that it bundles and reflects electromagnetic waves 24 towards the detector 110.

In one embodiment, the reflective surface comprises a reflective coating. The reflective coating has the function of a mirror and may comprise metal and/or glass. The reflector may also be a parabolic reflector. The reflected beam(s) 24 are reflected towards the parabolic reflector. The reflector bundles the beam(s) 24 and directs it to the detector 110.

Figure 4:
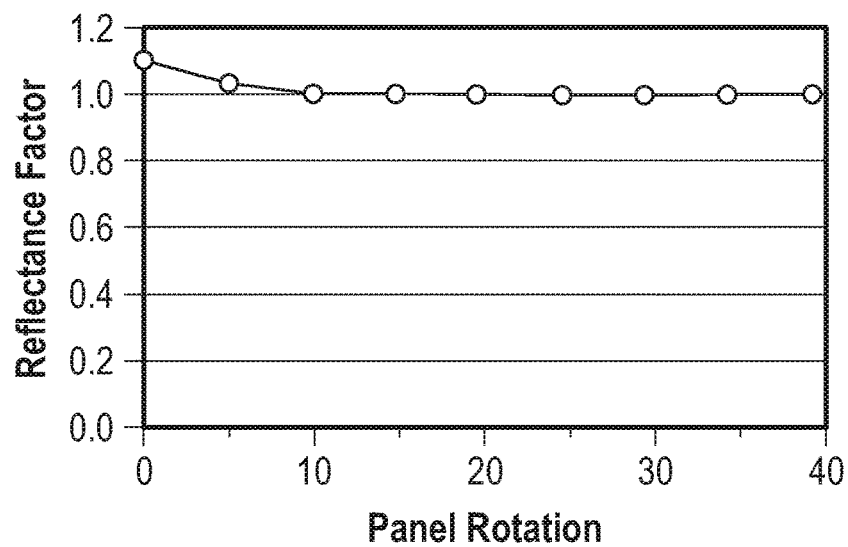
FIG. 4 shows a measured reflectance factor over an incident angle of lidar signals onto a panel.

FIG. 4 exemplarily shows the reflectance factor of the painted object over the panel rotation angle, i.e., over the incident angle of the primary beam. The reflectance factor is standardized to a reference reflection that is 1.0. As can be seen in FIG. 4, the reflectance factor at 0° is higher than 1.0, i.e., the reflectance of the respective coating is higher than the reflectance of a reference coating at 0°. While the incident angle increases, the reflectance factor approaches 1.0. At about 10°, the reflectance factor is 1.0.

Figure 5:
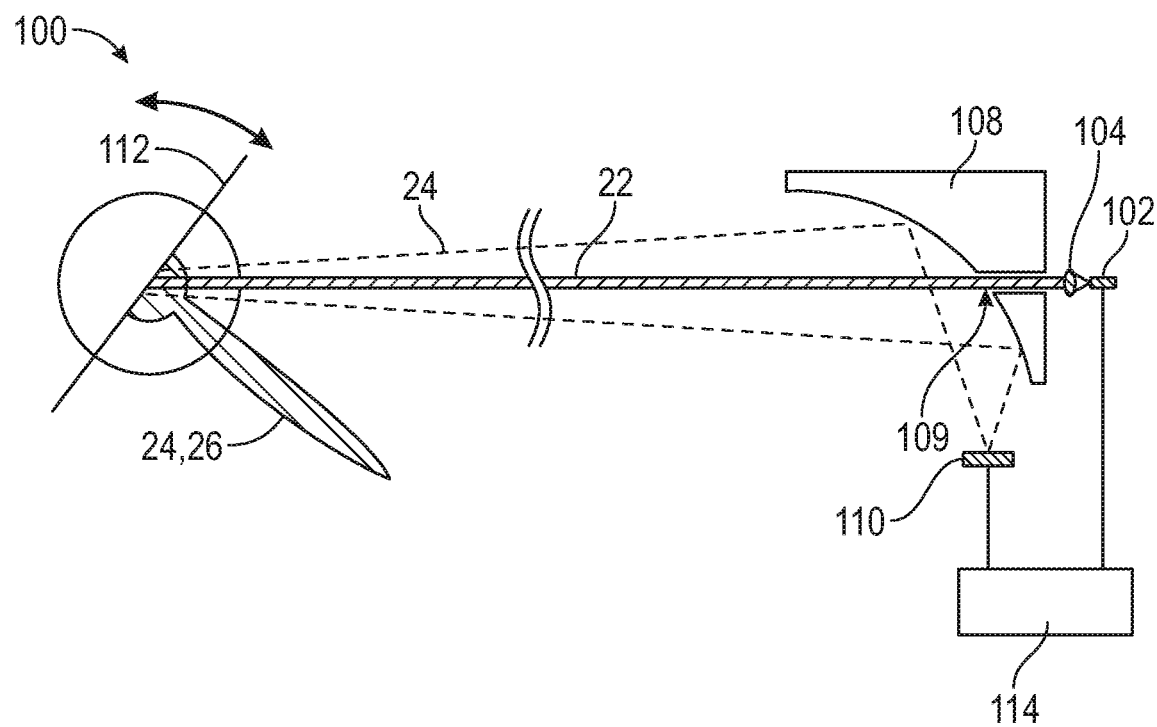
FIG. 5 shows an exemplary embodiment of a system for measuring the reflectivity of a painted object.

FIG. 5 shows a system 100 similar to the system shown in FIG. 3. However, in FIG. 5, the reflectivity of the painted object is different. Furthermore, in FIG. 5, the control unit 114 is shown. The control unit 114 is communicatively connected at least to the laser diode 102 and to the detector 110. The control unit 114 may control the laser diode to emit the primary beam. Furthermore, the control unit 114 receives the detected intensity of the reflected beam 24 from the detector 110.

Figure 6:
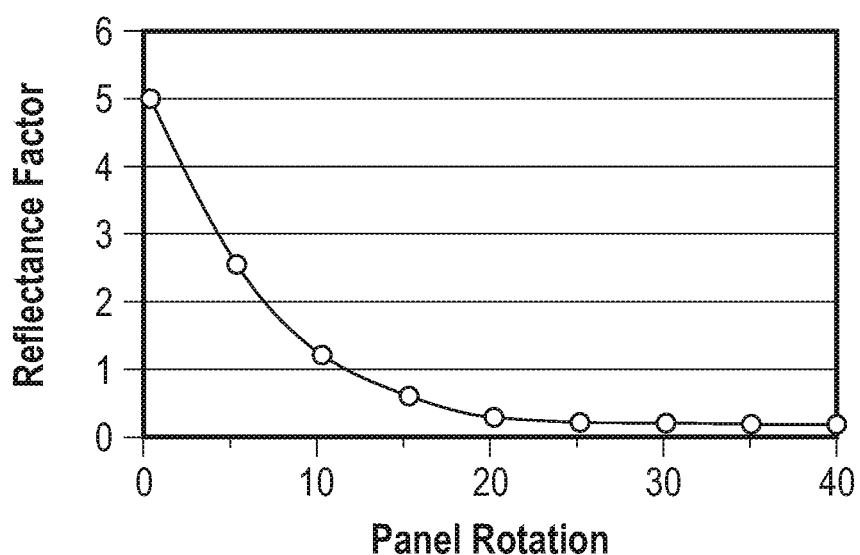
FIG. 6 shows a measured reflectance factor over an incident angle of lidar signals onto a panel.

FIG. 6 shows the reflectance factor over the panel rotation (incident angle of primary beam onto the painted object). In contrast to FIG. 4, the reflectance factor is very high (much higher than 1.0) for angles between 0° and 10° and is clearly below 1.0 for angles of 15° or more. In other words, the reflectance characteristics of the coatings to which the diagrams of FIGS. 4 and 6 belong are different.

The system 100 described herein allows determining the reflectivity of a painted object depending on the incident angle of a primary beam and comparing the reflective characteristics of different colors or coatings with each other and/or with a reference coating. This is shown in FIG. 7.

Figure 7:
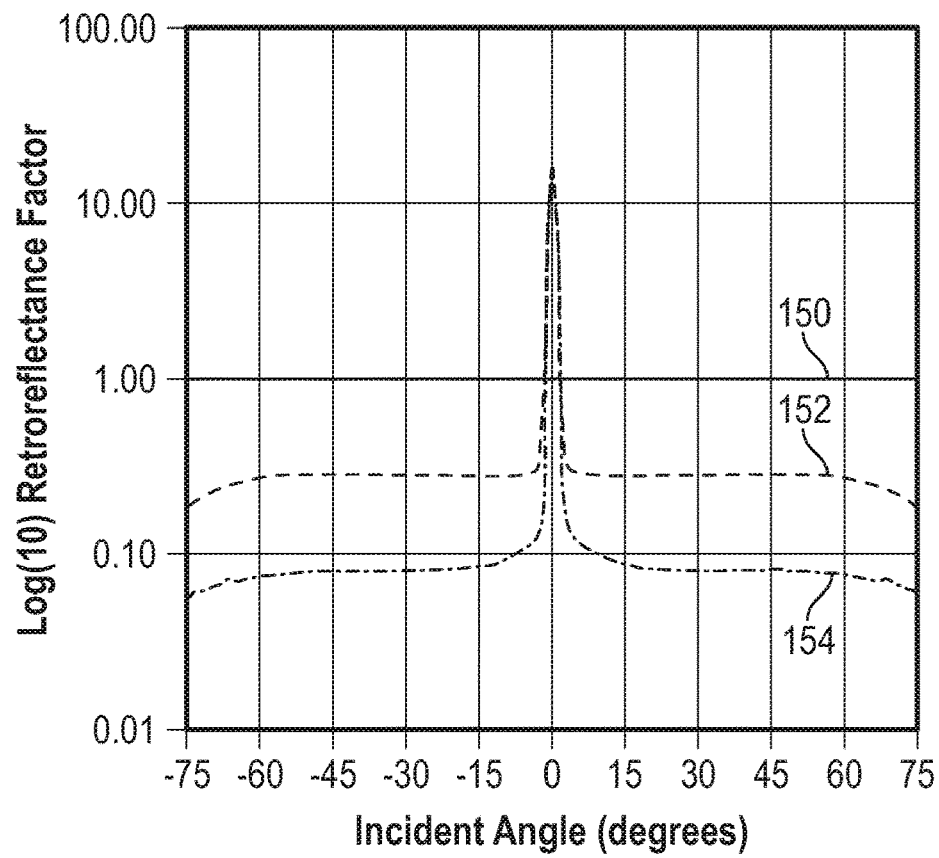
FIG. 7 shows two measured reflectance factors over an incident angle of lidar signals onto panels having different coatings.

FIG. 7 shows the retro-reflectance factor of a painted object over an incident angle of the primary beam between −75° and +75° with respect to a sample normal. A reference reflection characteristic is shown at 150. Reflection characteristics 152 and 154 of painted objects having first and second coatings. It can be seen that the reflectance characteristics are symmetric to the sample normal of 0°. Furthermore, the intensity of the reflected beams 152, 154 can be compared to the reference reflection 150.

Figure 8:
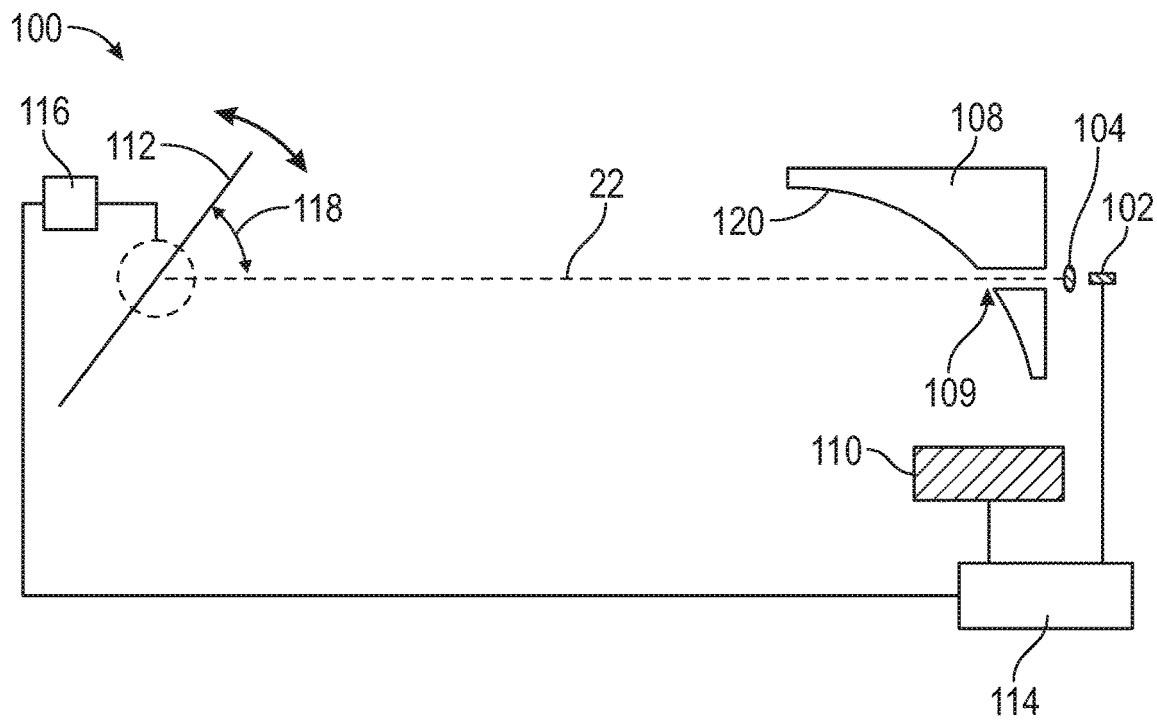
FIG. 8 shows an exemplary embodiment of a system for measuring the reflectivity of a painted object.

FIG. 8 shows a system 100 similar to the system shown in FIG. 3 and FIG. 5. In FIG. 8, an actuator 116 is shown that is coupled to the panel to rotate the painted object 112. The actuator 116 is communicatively coupled to the control unit 114 by a wired connection (same as the wired connections between the control unit 114 and the detector 110 and the laser diode 102). The wired connection may be used to transmit power and/or commands from the control unit to the actuator.

The incident angle 118 of the primary beam 22 onto the painted object is measured between the surface of the painted object and the direction of the primary beam 22.

When commanding the actuator to rotate the painted object either clockwise or counter-clockwise, the incident angle 118 changes.

The actuator 116 is mechanically coupled with the panel 106 and communicatively connected to the control unit 114. The control unit 114 is configured to send commands to the actuator to move the panel into a desired angular position to adjust a predetermined incident angle value 118.

The control unit 114 controls the actuator 116, and the actuator brings the panel into a desired angular position. In that position, the laser diode emits laser light towards the sample object and the detector detects the intensity of the light reflected by the sample objects towards the reflector and detector. Thus, the reflectivity of the sample object can be determined over the incident angle of the laser light or, generally, of the primary beam, be it pulsed or continuous light.

For example, the actuator is a stepper motor. The stepper motor may be arranged directly at the axis of rotation of the panel and may be directly coupled to the panel. Alternatively, the stepper motor may be coupled to the panel by a gear.

In one embodiment, the actuator is configured such that it rotates the panel by increments of a predeterminable angle value in a given direction each time it receives a rotate-command.

The panel may be rotated in a clockwise or counter-clockwise direction. For example, the panel may be rotated by 1° (counter-clockwise) or −1° (clockwise) each time it receives a rotation command. Other angle values of an angle-increment are possible.

The panel may comprise fasteners to hold the painted object in its required position. The fasteners may be clamps that hold the painted object. The painted object may be a sheet metal that is painted with a particular coating. Thus, the reflectivity of a coating over the incident angle can be determined.

The reflector 108 comprises an opening 109 (also in the embodiments shown in FIG. 3 and FIG. 5). The laser diode 102 is arranged on a first side of the opening (behind the reflector when seen from the perspective of the painted object) and the panel with the painted object are arranged on the opposite side of the reflector. The primary beam 22 passes the opening 109 and hits the surface of the painted object and is then reflected back to the reflector. The opening 109 is small to let the primary beam pass. However, since the painted object scatters the primary beam, a major part of the light is reflected to the reflective surface 120 of the reflector and then bundled towards the detector 110.

In one embodiment, the control unit 114 is configured to control the electromagnetic wave source 102 to emit a laser beam 22 at a predetermined first intensity, to generate and send a command instructing the panel 106 to rotate to a given position and/or orientation with regard to the primary beam 22, and to determine a second intensity of the electromagnetic wave 24 detected by the detector. The control unit is further configured to determine the reflectivity of the painted object for a multitude of angular positions of the panel (incident angle of primary beam onto the panel or painted object) by determining the share of the second intensity in proportion to the first intensity for each angular position.

In one embodiment, the control unit is configured to determine the reflectivity of the painted object at angular positions of the panel between +90° and −90°, wherein a 0°-position corresponds to the position in which the electromagnetic wave impinges the panel perpendicularly and parallel to the panel normal.

In one embodiment, the system further comprises a painted object, wherein the painted object is positioned on a surface of the panel so that the electromagnetic wave impinges on the painted object and is reflected by the painted object.

In one embodiment, a coated surface of the painted object is coated with at least one of a solid color, an effect color, and a gonioapparent color, wherein the painted object is arranged such that the electromagnetic wave emitted by the electromagnetic wave source impinges the coated surface.

Figure 9:
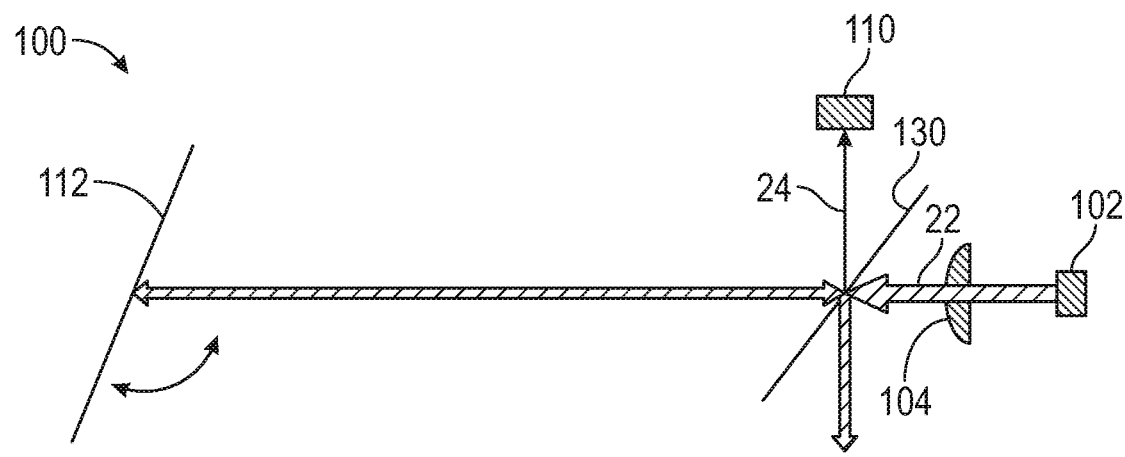
FIG. 9 shows an exemplary embodiment of a system for measuring the reflectivity of a painted object.

FIG. 9 shows another embodiment of the system 100. This embodiment comprises a laser diode 102, a lens 104, a detector 110, and a panel with a painted object 112. These elements are functionally identical to the elements with same reference numerals in the other embodiments described herein. However, instead of a parabolic reflector as shown in FIGS. 3, 5, and 8, a beam splitter 130 is used in FIG. 9. The primary beam 22 partially passes the beam splitter 130 towards the painted object 112. Another part of the primary beam is directed to the bottom of FIG. 9. The painted object 112 reflects the primary beam 22 back to the beam splitter. Part of the reflected beam is directed to the detector by the beam splitter 130.

In this embodiment, the reflector is a beam splitter 130, and the beam splitter is arranged between the electromagnetic wave source 102 and the panel.

In one embodiment, the beam splitter 130 is inclined with respect to the incident direction of the electromagnetic wave 22 so that the electromagnetic wave reflected by the painted object towards the beam splitter is at least partially redirected towards the detector.

Figure 10:
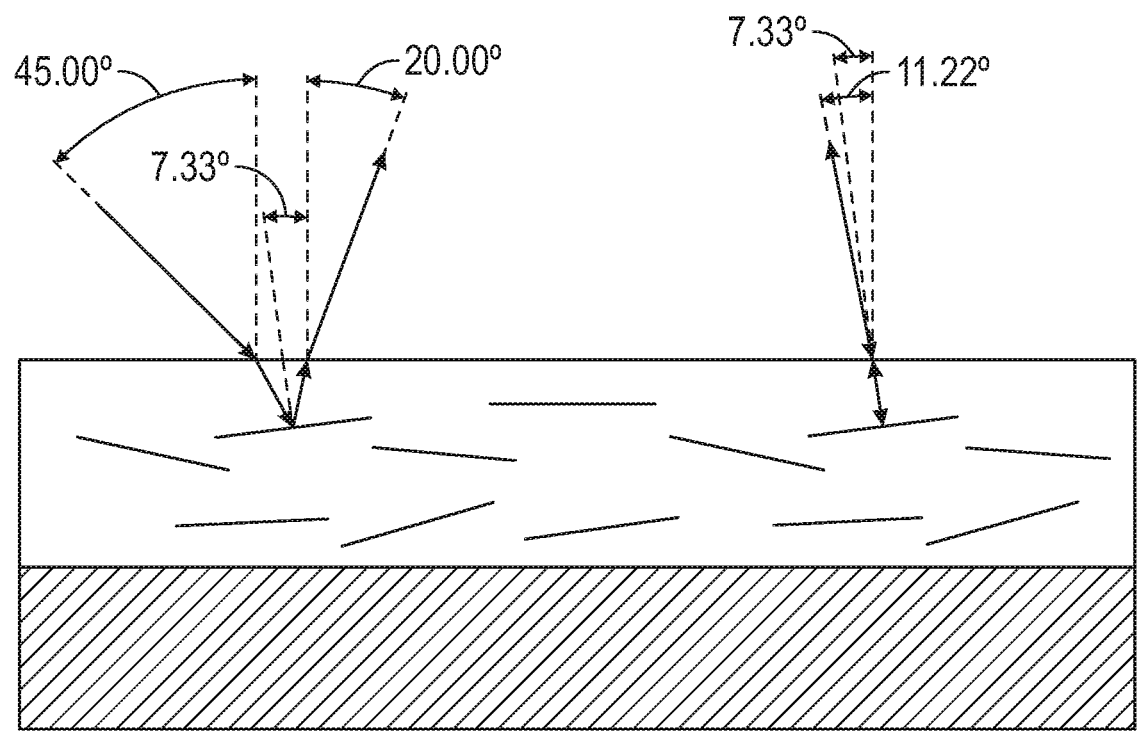
FIG. 10 exemplarily shows measurement geometries and flake angles of effect paint surfaces.

FIG. 10 shows the effect of flakes on the reflection geometry of a painted object. For effect paint surface, every measurement geometry (bidirectional, light source and detector are placed at different positions or directions when seen from the painted object, or retroreflective, as shown in FIGS. 3, 5, 8, and 9, light source and reflector/detector-arrangement are placed at same direction when seen from the painted object, see FIG. 11) samples the subset of effect pigment flakes that are oriented as specular reflectors for the geometry. The drawing on the left shows a bidirectional measurement geometry while the drawing on the right shows a retroreflective geometry. The angle between the sample normal and the surface normal of this subset of flakes is known as the flake angle (7.33° in this example). Each retroreflection geometry has one or more equivalent bidirectional geometries.

Lidar measures retro-reflected light resulting from a variety of mechanisms, including Fresnel interface reflections, diffuse scattering from pigment particles, specular reflection from effect flake. Only the subset of flake that are oriented so as to act as specular mirrors for the particular measurement geometry contribute to the flake-portion of the signal. The angular subset responsible for the flake portion of the signal for each retro-reflective geometry can be calculated with Snell's law of refraction. If measuring the reflectance factor with a bi-directional geometry rather than a retro-reflective geometry, the equivalent bi-directional geometry can be similarly calculated again with Snell's law.

FIG. 10 shows incoming light on a surface of a painted object. The lower hatched layer corresponds to the material of the painted object having a coating in which multiple flakes are arranged. Light refraction occurs when light enters the coating because of the different refractive indexes of air and coating.

Figure 11:
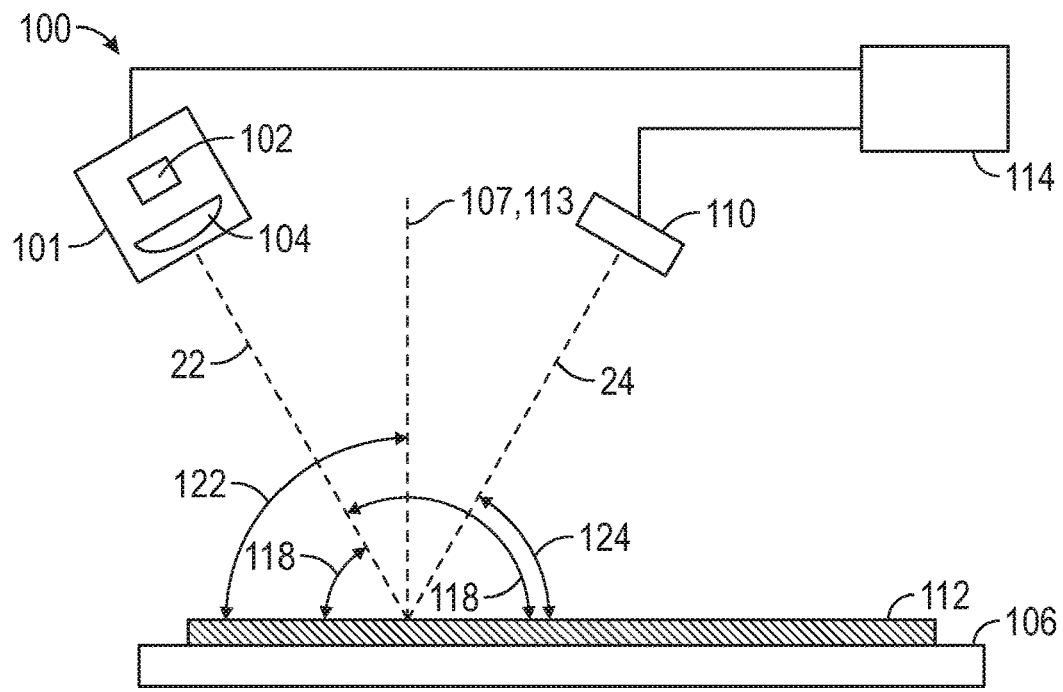
FIG. 11 shows an exemplary embodiment of a system for measuring the reflectivity of a painted object.

FIG. 11 shows a system 100 that is functionally similar to the system shown in FIGS. 3, 5, 8, and 9. However, in FIG. 11, the laser diode 102 and the detector 110 are arranged at different angles with respect to the painted object 112.

The sample normal 107 is arranged at a right angle 122 with respect to the surface of the painted object 112. The primary beam 22 that is emitted by the laser diode 102 is at incident angle 118 with respect to the surface of the painted object. The reflected beam 24 is reflected with the reflection angle 124 with respect to the surface of the painted object. Given that the painted object is a flat element, the incident angle 118 and the reflection angle 124 may be measured clockwise or counter-clockwise. These angle values may be used as equivalent input values for the incident angle to indicate the relative angular position of the painted object 11 with respect to the primary beam 22.

The function of the control unit 114, the detector 110, the laser diode 102 is similar to the other embodiments described herein.

In some embodiments, a system 100 for measuring the reflectivity of a painted object 112 comprises a panel 106 that is configured to hold the painted object 112, an electromagnetic wave source 102 that is configured to emit an electromagnetic wave 22 so that the electromagnetic wave impinges the panel 106 at a predetermined incident angle 118 with respect to the panel, a detector 110 that is configured to detect an intensity of electromagnetic waves 24 reflected by the painted object 112 at a predetermined reflection angle 124 with respect to a surface of the panel, and a control unit 114. The control unit is communicatively connected to the electromagnetic wave source 102 and to the detector 110. The control unit 114 is configured to determine an intensity of the electromagnetic wave 22 emitted towards the panel, to receive the intensity of the electromagnetic wave 24 detected by the detector, and to determine the reflectivity of the painted object as a function of the intensity of the electromagnetic waves detected by the detector and the intensity detected by the detector.

In some embodiments, the electromagnetic wave source 102 is a laser that is configured to emit electromagnetic waves in the range between 10 μm and 250 nm. For example, the electromagnetic wave is a lidar-signal.

In some embodiments, the electromagnetic wave source is a light emitting diode or an incandescent light source.

In some embodiments, the incident angle is between 0 degrees and 180 degrees and the reflection angle is between 0° and 180°.

Figure 12A:
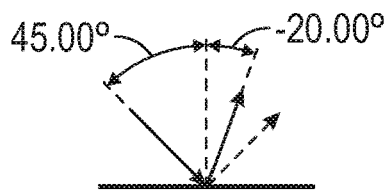
FIGS. 12A to 12F show example geometries for measuring flake angles.
Figure 12B:
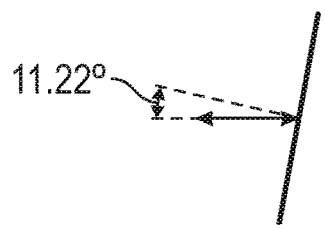
Figure 12C:
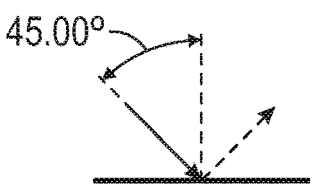
Figure 12D:
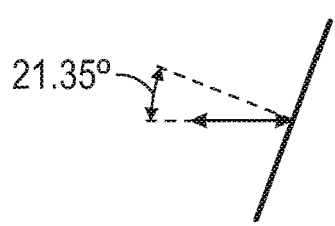
Figure 12E:
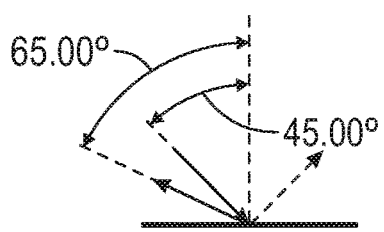
Figure 12F:
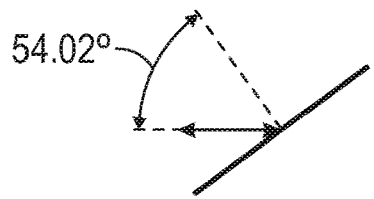

FIGS. 12A to 12F show example equivalent geometries which measure a series of flake angles as both bidirectional and retro-reflective geometries. The geometries shown in FIGS. 12A, 12C, 12E each show a bidirectional geometry while FIGS. 12B, 12D, 12F show a respective corresponding retro-reflective geometry. The geometry shown in FIGS. 12A and 12B starts from a flake angle of 7.33°. The bidirectional illumination angle (incident angle of primary beam 22) of 45° and a bidirectional detection angle of −20°, the equivalent retroreflective geometry has an incident angle of the primary beam of 11.22°. The geometry shown in FIGS. 12C and 12D has a flake angle of 13.81°, the incident angle of primary beam is identical to the geometry shown in FIGS. 12A and 12B. The bidirectional detection angle is 0°. The equivalent retroreflective geometry has an incident angle of the primary beam of 21.35°. In the geometry shown in FIGS. 12E and 12F, the incident angle of primary beam again is 45°, the flake angle is 31.90°. The bidirectional detection angle is 55° and the equivalent retroreflective geometry has an incident angle of the primary beam of 54.02°.

Figure 13:
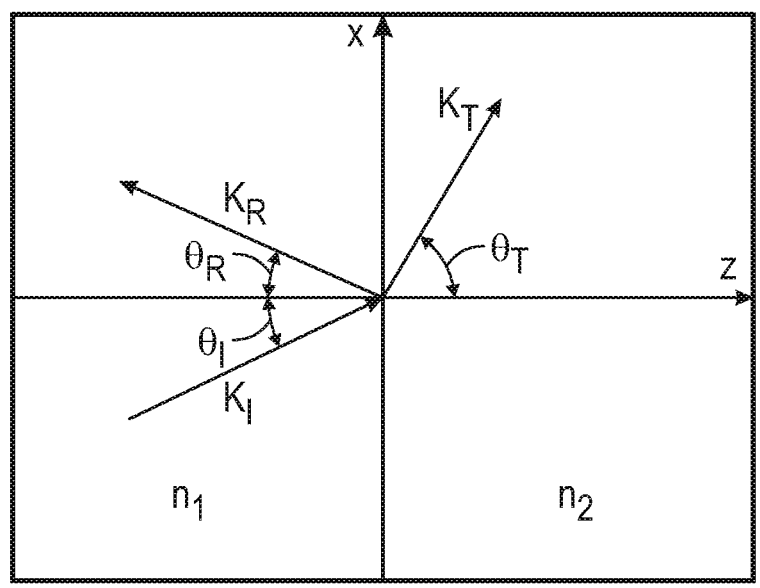
FIG. 13 shows an exemplary diffuse and interface reflection.

FIG. 13 shows an example of interface reflection. As the diffuse portion of the lidar signal results from Lambertian scattering, it can be measured by any geometry. Fresnel interface reflection occurs when light passes from a material with refractive index n1 into another material with refractive index n2 according to the following equations:

$$R_s = \left|\frac{n_1\cos\theta_i - n_2\cos\theta_t}{n_1\cos\theta_i + n_2\cos\theta_t}\right|^2 = \left|\frac{n_1\cos\theta_i - n_2\sqrt{1-\left(\frac{n_1}{n_2}\sin\theta_i\right)^2}}{n_1\cos\theta_i + n_2\sqrt{1-\left(\frac{n_1}{n_2}\sin\theta_i\right)^2}}\right|^2,$$

$$R_p = \left|\frac{n_1\cos\theta_t - n_2\cos\theta_i}{n_1\cos\theta_t + n_2\cos\theta_i}\right|^2 = \left|\frac{n_1\sqrt{1-\left(\frac{n_1}{n_2}\sin\theta_i\right)^2} - n_2\cos\theta_i}{n_1\sqrt{1-\left(\frac{n_1}{n_2}\sin\theta_i\right)^2} + n_2\cos\theta_i}\right|^2.$$

In these equations, $R_s$ and $R_p$ represent the interface reflections for s and p polarized light.

Figure 14:
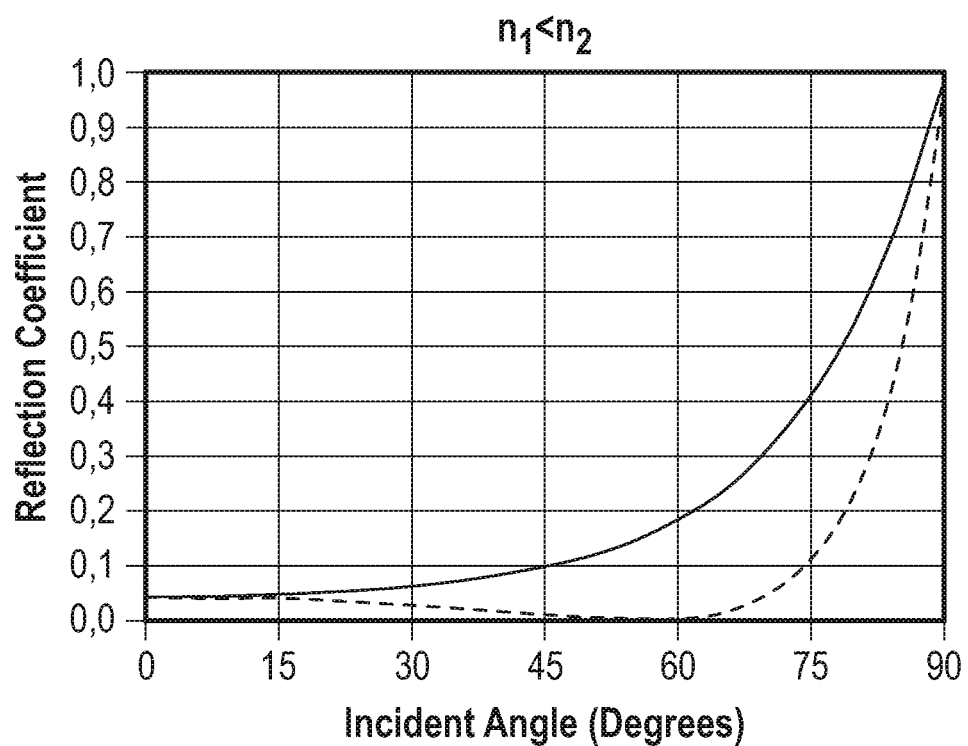
FIGS. 14 and 15 show exemplary interface reflections as a function of incident angle.
Figure 15:
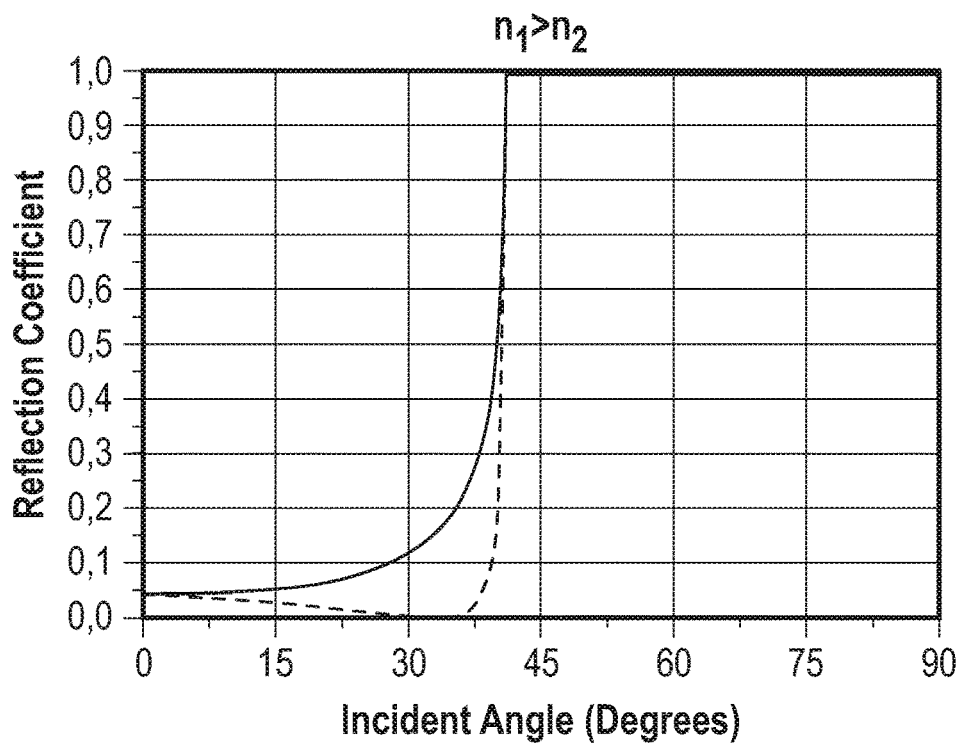

FIG. 14 and FIG. 15 show the Fresnel interface reflection as a function of incident angle. A measurement made with bidirectional geometry may be corrected for difference in Fresnel interface reflection loss to properly reflect the performance of a retro-reflective lidar system.

Figure 16:
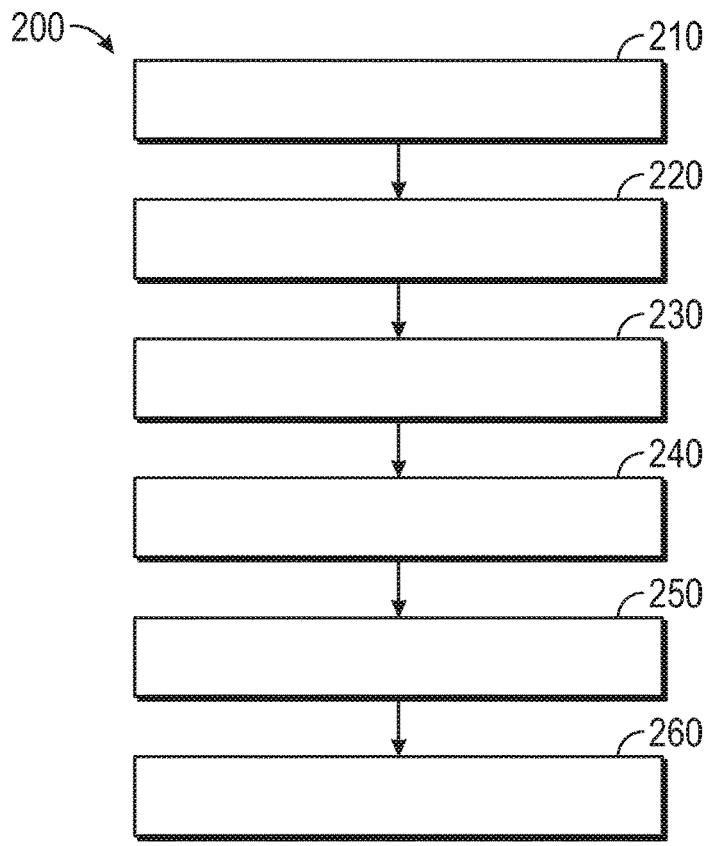
FIG. 16 shows an exemplary method according to an embodiment.

FIG. 16 schematically shows the steps of a method 200 for measuring the reflectivity of a painted object. The method comprises the following steps: emitting, in a first step 210, by an electromagnetic wave source, an electromagnetic wave towards the painted object; rotating, in a subsequent step 220, by a movable panel, the painted object to adjust an incident angle of the electromagnetic wave onto the painted object; determining, in a subsequent step 230, by a detector, an intensity of an electromagnetic wave that is reflected by the painted object; determine, in a subsequent step 240, by a control unit, the incident angle of the electromagnetic wave; receiving, in a subsequent step 250, by the control unit, the intensity of the electromagnetic waves from the detector; determining, in a subsequent step 260, by the control unit, the reflectivity of the painted object as a function of the intensity of the electromagnetic wave determined by the detector over a predetermined range of incident angle values.

It is noted that the method particularly corresponds to the functions described above with reference to the system. Therefore, what is described above and hereinafter with reference to the system applies in a similar manner to the method.

In one embodiment, the method further comprises the step of rotating the panel about an axis of rotation to change the incident angle. This step is carried out by commanding the actuator to rotate the panel.

Although vehicle and vehicle coating are specifically described in some examples, this disclosure can also be used for other coated articles that are subject to distance calculation with lidar systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for measuring the reflectivity of a painted object, the system comprising:
   an electromagnetic wave source that is configured to emit an electromagnetic wave;
   a panel that is configured to hold the painted object, wherein the panel is movable to adjust an incident angle of the electromagnetic wave onto the panel;
   a reflector that is arranged to receive and direct electromagnetic waves that are reflected by the painted object towards the reflector;
   a detector that is configured to detect an intensity of electromagnetic waves;
   a control unit;
   wherein the control unit is communicatively connected to the panel and to the detector;
   wherein the control unit is configured to determine the incident angle of the electromagnetic wave, to receive the intensity of the electromagnetic wave detected by the detector, and to determine the reflectivity of the painted object as a function of the intensity of the electromagnetic wave detected by the detector over a predetermined range of incident angle values.

2. The system of claim 1,
   wherein the electromagnetic wave source is a laser that is configured to emit electromagnetic waves in the range between 10 µm and 250 nm.

3. The system of claim 1,
   wherein the electromagnetic wave source is a light emitting diode or an incandescent light source.

4. The system of claim 1,
   wherein the panel is rotatable about an axis of rotation to change the incident angle.

5. The system of claim 1,
   further comprising an actuator that is mechanically coupled with the panel;
   wherein the actuator is communicatively connected to the control unit;
   wherein the control unit is configured to send commands to the actuator to move the panel into a desired angular position to adjust a predetermined incident angle value.

6. The system of claim 5,
   wherein the actuator is configured such that it rotates the panel by increments of a predeterminable angle value in a given direction each time it receives a rotate-command.

7. The system of claim 1,
   wherein the reflector comprises a reflective surface;
   wherein the reflective surface is curved such that it bundles and reflects electromagnetic waves towards the detector.

8. The system of claim 7,
   wherein the reflective surface comprises a reflective coating.

9. The system of claim 1,
   wherein the reflector is a beam splitter;
   wherein the beam splitter is arranged between the electromagnetic wave source and the panel.

10. The system of claim 9,
    wherein the beam splitter is inclined with respect to the incident direction of the electromagnetic wave so that the electromagnetic wave reflected by the painted object towards the beam splitter is at least partially redirected towards the detector.

11. The system of claim 1,
    wherein the control unit is configured to control the electromagnetic wave source to emit a laser beam at a predetermined first intensity, to generate and send a command instructing the panel to rotate to a given position and/or orientation, and to determine a second intensity of the electromagnetic wave detected by the detector;
    wherein the control unit is configured to determine the reflectivity of the painted object for a multitude of angular positions of the panel by determining the share of the second intensity in proportion to the first intensity for each angular position.

12. The system of claim 11,
    wherein the control unit is configured to determine the reflectivity of the painted object at angular positions of the panel between +90° and −90°, wherein a 0°-position corresponds to the position in which the electromagnetic wave impinges the panel perpendicularly and parallel to the panel normal.

13. The system of claim 1, further comprising:
    a painted object;
    wherein the painted object is positioned on a surface of the panel so that the electromagnetic wave impinges on the painted object and is reflected by the painted object.

14. The system of claim 13,
    wherein a coated surface of the painted object is coated with at least one of a solid color, an effect color, and a gonioapparent color;
    wherein the painted object is arranged such that the electromagnetic wave emitted by the electromagnetic wave source impinges the coated surface.

15. A system for measuring the reflectivity of a painted object, the system comprising:
    a panel that is configured to hold the painted object;
    an electromagnetic wave source that is configured to emit an electromagnetic wave so that the electromagnetic wave impinges the panel at a predetermined incident angle with respect to the panel;
    a detector that is configured to detect an intensity of electromagnetic waves reflected by the painted object at a predetermined reflection angle with respect to a surface of the panel;
    a control unit;
    wherein the control unit is communicatively connected to the electromagnetic wave source and to the detector;
    wherein the control unit is configured to determine an intensity of the electromagnetic wave emitted towards the panel, to receive the intensity of the electromagnetic wave detected by the detector, and to determine the reflectivity of the painted object as a function of the intensity of the electromagnetic waves detected by the detector and the intensity detected by the detector.

16. The system of claim 15,
    wherein the electromagnetic wave source is a laser that is configured to emit electromagnetic waves in the range between 10 µm and 250 nm.

17. The system of claim 15,
    wherein the electromagnetic wave source is a light emitting diode or an incandescent light source.

18. The system of claim 15,
wherein the incident angle is between 0 degrees and 180 degrees;
wherein the reflection angle is between 0° and 180°.

19. A method for measuring the reflectivity of a painted object, the method comprising the following steps:
emitting, by an electromagnetic wave source, an electromagnetic wave towards the painted object;
rotating, by a movable panel, the painted object to adjust an incident angle of the electromagnetic wave onto the painted object;
determining, by a detector, an intensity of an electromagnetic wave that is reflected by the painted object;
determining, by a control unit, the incident angle of the electromagnetic wave;
receiving, by the control unit, the intensity of the electromagnetic waves from the detector;
determining, by the control unit, the reflectivity of the painted object as a function of the intensity of the electromagnetic wave determined by the detector over a predetermined range of incident angle values.

20. The method of claim 19, further comprising the step:
rotating the panel about an axis of rotation to change the incident angle.

\* \* \* \* \*